United States Patent Office 3,433,611
Patented Mar. 18, 1969

3,433,611
STRENGTHENING GLASS BY MULTIPLE ALKALI ION EXCHANGE
Arnold E. Saunders, Saxonburg, and Robert E. Kubichan, Tarentum, Pa., assignors to PPG Industries, Inc., a corporation of Pennsylvania
Filed Sept. 9, 1965, Ser. No. 486,126
U.S. Cl. 65—30                    10 Claims
Int. Cl. C03c 21/00

ABSTRACT OF THE DISCLOSURE

The present invention relates to a method of preparing strengthened glass articles by ion exchange of an alkali metal containing glass with two or more different ions of greater ionic diameter than an alkali metal ion present in the glass. More particularly, the present invention relates to a method of strengthening lithium-containing glasses by contacting said glasses with a mixture of potassium and sodium salts below the strain point of said glass. The invention especially pertains to ion exchange strengthening of a lithium-containing glass by simultaneous exchange of potassium and sodium ions wherein the potassium ions are present in greater quantity than the sodium ions.

---

Ion exchange strengthening treatments are of two general types. The first of these types is represented by U.S. 2,779,136, issued to Hood et al. This patent discloses the ion exchange of a relatively small size ionic diameter alkali metal ion, such as lithium ion, from a molten salt bath for a relatively larger size ionic diameter alkali metal ion, such as sodium ion, from the glass. The exchange is conducted at a temperature above the strain point of the glass and results in altering the glass surface composition to a composition having a lower coefficient of thermal expansion than the coefficient of thermal expansion of the interior glass composition. The difference in thermal expansions of the surface and interior zones results in a surface compressive stress developing in the glass article when it is cooled to room temperature.

The second general type of ion exchange treatment used to increase the strength of glass is represented by Republic of South Africa Patent 622,353, issued to Corning Glass Works. This ion exchange technique involves exchanging a relatively large ionic diameter alkali metal ion from a molten salt bath for a relatively smaller ionic diameter alkali metal from the glass at a temperature below the strain point of the glass. At this temperature, the surface of the glass does not relax to accommodate the larger sized ion being exchanged into it. The result is the production of a surface compressive stress when the ion exchanged glass article is cooled to room temperature. The mechanism differs from that taught by Hood et al. in U.S. 2,779,136 in that it involves mechanically wedging a larger ion into the hole left in the glass surface structure by the removal of a smaller ion.

Ions other than the alkali metals ions have also been exchanged in glass. J. S. Turnbull and W. A. Weyl in their article entitled "Staining Glasses with Silver, a Possibility of Studying Inhomogeneities" (the Glass Industry, 1940), disclose ion exchanging silver ions for sodium ions in a glass article to detect inhomogeneities by observing differences in the amount of silver staining developed in various parts of the article.

U.S. 2,647,068, issued to Imre Patai, discloses a method of silver staining a soda glass by contacting the glass with a molten salt bath containing a mixture of alkali metal ions and silver ions. The stain produced results from the exchange of silver ions from the mixed bath for sodium ions in the glass. No ion exchange of alkali metal ions from the bath for sodium ions in the glass is realized. The exchange is also not noted to result in any glass article strength improvement. Although the Patai bath contains a mixture of ions only the silver ions preferentially exchange in the glass.

In our copending application Ser. No. 293,271, now abandoned, filed July 8, 1963, by Dale W. Rinehart, there are disclosed several ion exchange strengthening treatments for a family of lithia-soda and/or potassium-phosphorous pentoxide-alumina-silica glass compositions. One of the ion exchange treatments disclosed is the exchange of sodium from a molten salt bath for lithium in the glass surface at a temperature below the strain point of the glass. A second ion exchange disclosed is the ion exchange of potassium from a molten salt bath for both lithium and sodium in the glass at a temperature below the strain point of the glass. Both techniques result in increased glass article strength.

The sodium for lithium ion exchange, disclosed by Dale W. Rinehart, results in a relatively thick surface compressive layer and a relatively low maximum surface compressive stress. The potassium for sodium and lithium ion exchange, on the other hand, results in a relatively high maximum surface compressive stress and a relatively thin surface compressive layer. Thin surface compressive layers such as those produced in potassium for sodium and/or lithium exchanges, since they are easily penetrated by surface scratches, result in poor abraded strengths even though the surface layers produced are high in compressive stress. A high surface compressive stress, though desirable because glass normally fails in tension from a surface initiated crack, is still inadequate to alone permit the production of commercially attractive glass articles. The surface compressive stress layer must also be of sufficient thickness to permit the glass article to retain its strength when abraded.

The earlier ion exchange techniques permitted a choice between the development of a relatively thick low maximum stress surface compressive layer or a relatively thin high maximum stress surface compressive layer. Both of the desirable conditions, a high surface compressive stress and a relatively thick surface compressive layer could not be obtained by a single ion exchange treatment.

What has been discovered in the present invention is a technique for obtaining both of these desirable conditions. More particularly, what has been discovered is that by properly compounding the composition of the base glass being ion exchanged and the composition of the ion exchange bath, the advantage of each type of ion exchange can be realized while minimizing the disadvantage of each. A family of glass compositions has also been discovered which undergoes a low degree of preferential ion exchange when treated in accordance with the techniques herein disclosed.

The calculated chemical compositional ranges of the components in the glasses found suitable for multiple, simultaneous ion exchange in accordance with the present invention are presented below:

| Component: | Percent by weight |
|---|---|
| $Li_2O$ | 2–15 |
| $Na_2O$ and/or $K_2O$ | 2–20 |
| $P_2O_5$ | 1–25 |
| $Al_2O_3$ | 10–35 |
| $SiO_2$ | 30–65 |
| ZnO | 0–12 |
| MgO | 0–8 |
| $B_2O_3$ | 0–10 |
| $ZrO_2$ | 0–8 |

The preferred calculated compositional ranges for the various components are presented below:

| Component: | Percent by weight |
|---|---|
| $Li_2O$ | 3–6 |
| $Na_2O$ and/or $K_2O$ | 4–12 |
| $P_2O_5$ | 2–12 |
| $Al_2O_3$ | 15–28 |
| $SiO_2$ | 40–60 |
| ZnO | 0–3 |
| MgO | 0–4 |
| $B_2O_3$ | 0–7 |
| $ZrO_2$ | 0–4 |

Various other oxide components such as CaO, BaO, $SiO_2$ and PbO can be incorporated in these glasses in amounts not to exceed approximately 2 percent by weight to modify the glass structure.

$TiO_2$ may also be present in these glasses in amounts not to exceed approximately 5 percent by weight to aid in controlling the high temperature viscosity characteristics of the glasses.

Various glass coloring ingredients such as compounds containing iron, cobalt, nickel, gold, silver, chromium, magnesium, copper, selenium, platinum and graphite may also be added in small concentrations to color the glass without impairing its desirable multiple and simultaneous ion exchange properties. Components such as $Sb_2O_5$, $As_2O_5$, $Na_2SO_4$, NaCl and S may also be incorporated in amounts up to about 1 percent by weight.

Characteristically mixed ion exchange baths are found to exhibit preferential ion exchange properties. Usually only the most mobile ion specie is exchanged to any significant degree even in baths containing very low concentrations of the most mobile ion. As a general rule, the preferentially exchanged ion has the smallest atomic diameter of the exchangeable ions in the bath.

In the present invention for the first time a mixed alkali ion exchange bath is used to treat a family of glass compositions which does not result in a preferential exchange of only one of the exchangeable ions. The greater depth to which the ion exchange is conducted and the relatively high surface compressive stress achieved make possible the production of strong unique glass articles.

To aid in explaining the techniques of the present invention, FIGURES 1 through 6 are provided in which:

Figure 1:
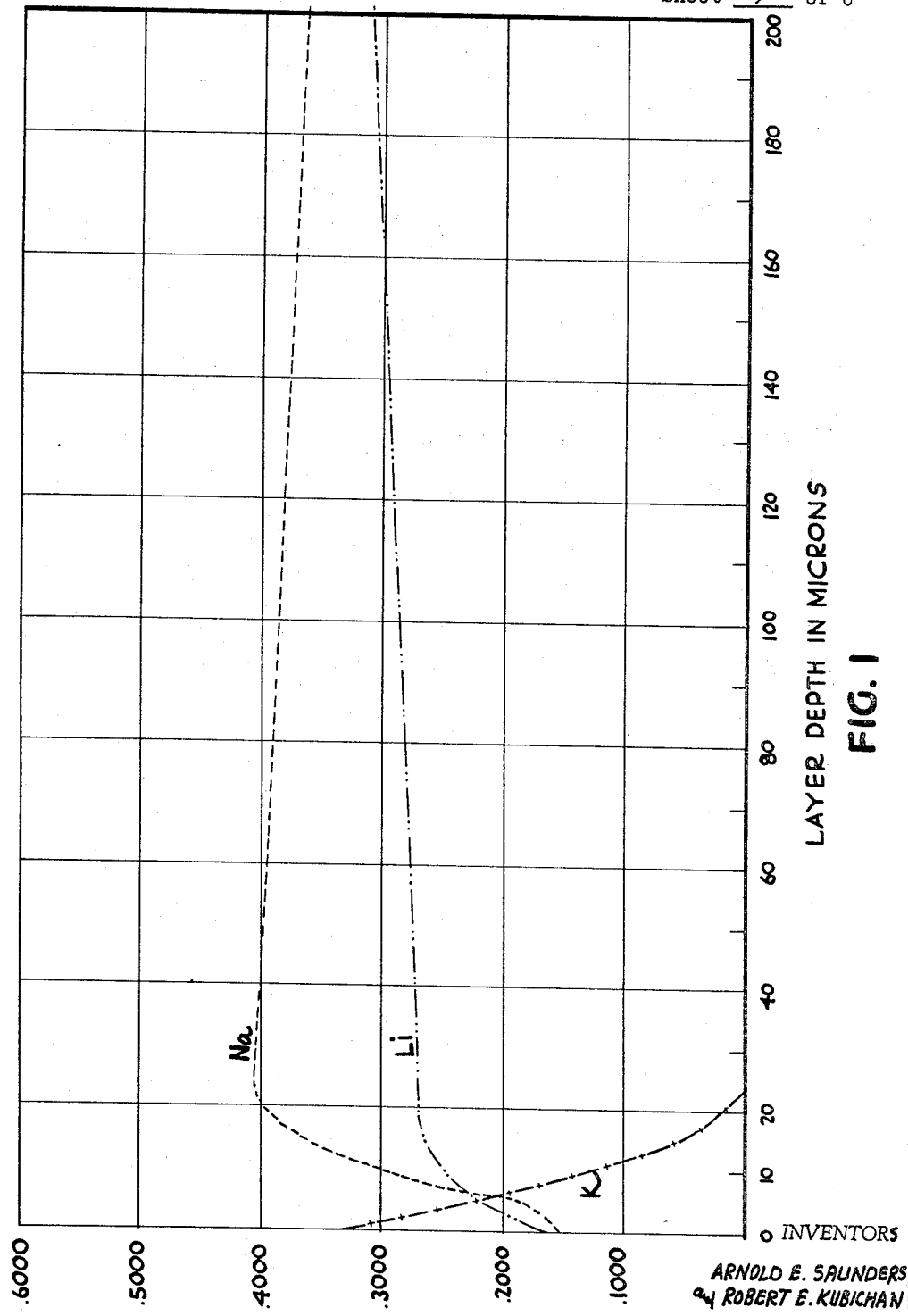
FIGURE 1 is a concentration profile of various alkali metal ions in the surface of a glass article treated in a mixed ion exchange bath containing a 20:1 ratio of $KNO_3$ to $NaNO_3$ on a molar basis as a function of glass thickness.

The present invention will be more fully understood by making reference to the following examples:

Example I is the preferred embodiment of the present invention and is the best mode contemplated by the inventor for practicing the teachings of his invention.

EXAMPLE I

Glass samples 4 inches by 4 inches by 1/10 of an inch thick were fabricated using conventional melting and forming techniques having the following calculated base glass composition:

Composition A

| Oxide component: | Percent by weight |
|---|---|
| $SiO_2$ | 44.38 |
| $Al_2O_3$ | 26.61 |
| $Li_2O$ | 5.04 |
| $Na_2O$ | 11.0 |
| $P_2O_5$ | 9.96 |
| ZnO | 3.0 |

The strain point of Composition "A" is approximately 971° F. Samples of this glass were then ion exchanged in mixed alkali metal molten salt baths by immersing the glass samples in the bath. Samples of this glass were also ion exchanged in single alkali metal ion molten salt baths for comparison purposes.

The ion exchanges were conducted in an apparatus consisting of a stainless steel container provided with a built in electrical resistance heater. The alkali metal salt or salts used were introduced into the stainless steel container and heated until the salts melted. No stirring mechanism was employed. The molten salts were homogenized by natural convection currents established by differential temperatures in the bath during heating.

Table I presented below compares the results of four ion exchange treatments on glass Composition A. The ratios of $KNO_3$ to $NaNO_3$ in the mixed baths indicated are molar ratios of $KNO_3$ to $NaNO_3$.

TABLE I

| Molten Salt | Temperature of Ion Exchange, ° F. | Treating Time | Total Compression Layer Depth | Surface Compression, Lbs. per Sq. In. |
|---|---|---|---|---|
| $NaNO_3$ | 850 | 30 minutes | 200 microns | 60,000 |
| $KNO_3$ | 925 | do | 18 microns | 96,600 |
| $KNO_3+NaNO_3$, 8=1 | 875 | do | 215 microns | 92,000 |
| $KNO_3+NaNO_3$, 20=1 | 875 | do | 185 microns | 98,900 |

The 8:1 ratio mixed $KNO_3+NaNO_3$ bath was prepared by combining 809 grams of $KNO_3$ and 85 grams of $NaNO_3$. The 20:1 ratio mixed $KNO_3+NaNO_3$ bath was prepared by combining 1,000 grams of $KNO_3$ and 42 grams of $NaNO_3$.

As can be seen from the table above, the 100 percent sodium nitrate ion exchange bath developed a relatively thick compressive surface layer (200 microns) and a moderate surface compressive stress (60,000 pounds per square inch). The potassium nitrate ion exchange, on the other hand, produced a much higher surface compressive stress (96,000 pounds per square inch) but a very shallow compression layer of only 18 microns. The mixed bath containing both sodium ions and potassium ions developed both a relatively thick compressive layer (215 and 185 microns) and a high surface compressive stress (92,000 and 98,900 pounds per square inch).

EXAMPLE II

A sample of Composition A, ½ inch by 1 inch by 1/10 of an inch thick was fabricated using conventional melting and forming techniques. This sample was ion exchanged in a mixed ion exchange bath containing $KNO_3$ and $KaNO_3$. The ratio of $KNO_3$ to $NaNO_3$ was 20:1 on a molar basis. The sample was treated for 60 minutes at 875° F. After the ion exchange treatment a flame spectrophotometric analysis was made to determine the potassium, sodium and lithium concentrations at various depths in the surface of the sample. These analytical results are presented below in Table II.

TABLE II.—FLAME SPECTROPHOTOMETRIC ANALYSIS

| Etch No. | Mid-point Micron Depth | Alkali Determined | | | Moles per 100 Gr. Glass | | |
|---|---|---|---|---|---|---|---|
| | | Percent K | Percent Na | Percent Li | K | Na | Li |
| 1 | .50 | 12.3 | 3.5 | 1.07 | .314 | .152 | .154 |
| 2 | 3.1 | 10.8 | 3.8 | 1.32 | .277 | .164 | .190 |
| 3 | 7.1 | 7.6 | 5.3 | 1.63 | .194 | .230 | .235 |
| 4 | 11.0 | 4.7 | 6.8 | 1.76 | .121 | .295 | .253 |
| 5 | 19.2 | .79 | 8.9 | 1.82 | .020 | .388 | .262 |
| 6 | 23.4 | | 9.2 | 1.87 | | .404 | .269 |
| 7 | 27.2 | | 9.2 | 1.86 | | .402 | .268 |
| 8 | 31.5 | | 9.1 | 1.86 | | .395 | .268 |
| 9 | 36.3 | | 9.2 | 1.87 | | .401 | .270 |
| 10 | 41.2 | | 9.2 | 1.90 | | .399 | .273 |
| 11 | 46.1 | | 9.2 | 1.90 | | .400 | .274 |
| 12 | 51.0 | | 8.9 | 1.89 | | .386 | .271 |
| 13 | 56.1 | | 9.2 | 1.92 | | .398 | .276 |
| 14 | 61.2 | | 8.9 | 1.90 | | .386 | .274 |
| 15 | 66.2 | | 9.0 | 1.94 | | .393 | .280 |
| 16 | 100.5 | | 8.9 | 2.02 | | .386 | .291 |
| 17 | 119.2 | | 8.7 | 2.01 | | .380 | .290 |
| 18 | 139.3 | | 8.6 | 2.05 | | .375 | .295 |
| 19 | 159.0 | | 8.7 | 2.08 | | .379 | .299 |
| 20 | 179.8 | | 8.5 | 2.11 | | .372 | .304 |
| 21 | 200.0 | | 8.4 | 2.14 | | .367 | .308 |
| 22 | 222.9 | | 8.3 | 2.14 | | .363 | .309 |
| 23 | 240.7 | | 8.3 | 2.15 | | .360 | .309 |

The concentration of sodium in the base glass was 8.1 percent by weight or .35 moles per hundred grams of glass. The concentration of lithium in the base glass was 2.2 percent by weight or .31 moles per hundred grams of glass. The base glass composition initially contained no potassium.

As can be seen from the analysis, the sodium concentration is greater than the base glass sodium concentration from a depth of about 20 microns to a depth in excess of 240 microns. The glass also contains a potassium concentration from the surface to a depth of about 20 microns. The lithium concentration is below that of the base glass for a depth in excess of 240 microns. The above analysis indicates that both potassium and sodium have been ion exchanged into the glass and that lithium has been removed.

FIGURE 1 is a plot of the lithium, sodium and potassium concentrations in percent by weight and in moles in per 100 grams of glass at various depths in the glass sample. The exact mechanism of this multiple ion exchange is not understood.

Figure 2:
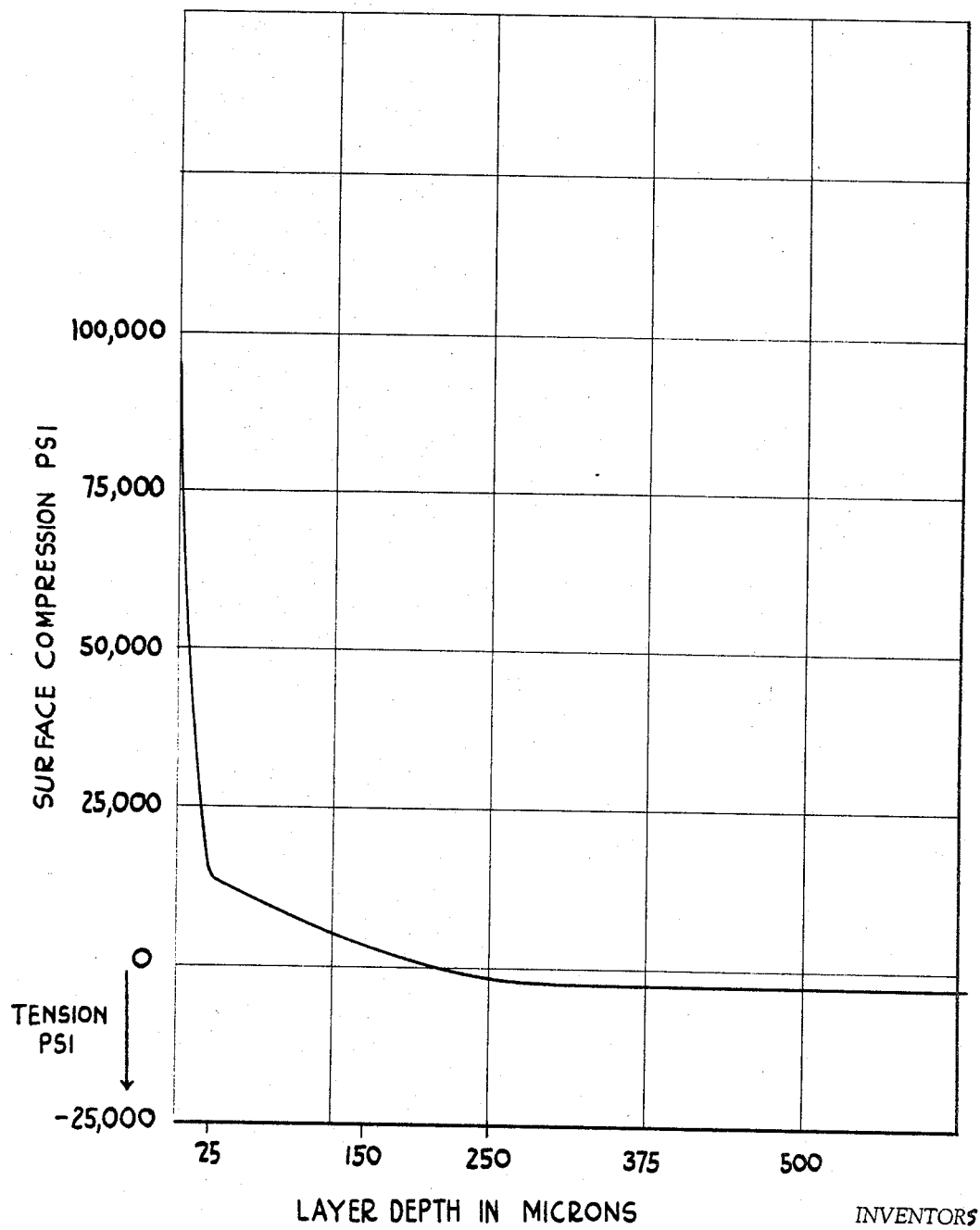
FIGURE 2 is a stress profile determined for a glass article ion exchanged in a 20:1 potassium nitrate to sodium nitrate mole ratio molten salt bath.

FIGURE 2 is the stress profile determined for the ½ inch by 1 inch by 1/10 of an inch sample of Composition A in Example II treated in the mixed 20:1 potassium to sodium mole ratio ion exchange bath. The maximum surface compressive stress occurs at the surface and is approximately 96,000 pounds per square inch. This surface compressive stress decreases rapidly as penetration is made into the sample unit, at a depth of about 25 microns, the stress has dropped to approximately 14,000 pounds per square inch. At this depth an abrupt change in the rate at which the compressive stress is being lost, occurs. As can be seen in FIGURE 2, the rate of compressive stress relaxation after the abrupt change is fairly constant but considerably decreased. A slight residual compressive stress is still present in the glass at a depth of 250 microns. The abrupt change in the rate of relaxation of the surface compressive stress or the knee in the stress profile curve occurs at approximately the same depth to which potassium has been exchanged. The knee also occurs at approximately the corresponding depth at which the sodium concentration in the glass surface is a maximum.

Comparing the chemical profile analysis and the stress profile, leads the applicant to believe that the portion of the stress profile from the surface to a depth of about 25 microns represents the stress induced in the glass surface by the exchange of potassium ion. The portion of the stress profile from the knee occurring at about 25 microns, to a depth of about 250 microns represents the stress induced by exchange of sodium ion.

The interior of the glass, that portion at least 300 microns from either surface, is in tension. The maximum tensile stress developed in the interior is approximately 2,000 pounds per square inch.

The typical article produced in the present invention by ion exchanging the A composition in a mixture of sodium and potassium salts exhibits three stress zones. These three stress zones are a surface compressive stress zone, an intermediate compressive stress zone, and an interior tensile stress zone. The concentration of lithium ion is greater in the interior tensile stress zone than in both the surface compressive stress zone and the intermediate compressive stress zone. The concentration of sodium ion is greater in the intermediate compressive stress zone than in both the central interior tensile stress zone and the surface compressive stress zone. The concentration of potassium ion is greater in the surface compressive stress zone than in both the intermediate compressive stress zone and the central interior tensile stress zone.

EXAMPLE III

A sample of Composition A glass ½ inch by 1 inch by 1/10 of an inch thick was prepared using conventional melting and forming techniques. The sample was then ion exchanged in a mixed potassium nitrate-sodium nitrate bath prepared by combining 805 grams of potassium nitrate and 85 grams of sodium nitrate. This mixed bath contained a mole ratio of potassium to sodium of 8:1. The ion exchange was conducted at a temperature of 875° F. for 60 minutes.

Figure 3:
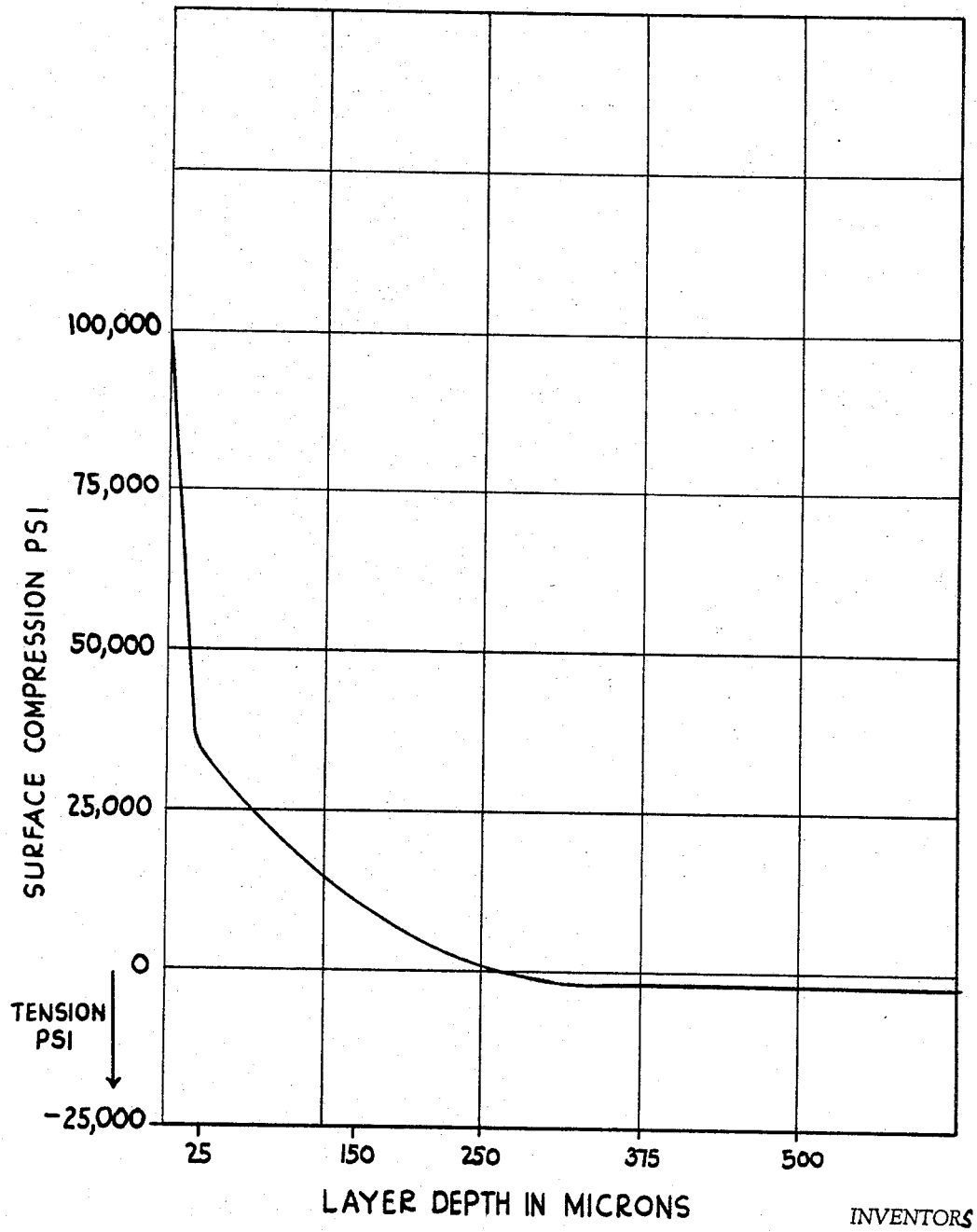
FIGURE 3 is a stress profile determined for a glass article ion exchanged in an 8:1 potassium nitrate to sodium nitrate mole ratio molten salt bath.

FIGURE 3 is the stress profile determined for this sample. The maximum compressive stress occurs at the glass surface, and is approximately 96,000 pounds per square inch. The surface compressive stress decreases rapidly as penetration is made into the glsas sample until, at a depth of about 25 microns, the surface compressive stress is approximately 35,000 pounds per square inch. At this depth an abrupt change in the rate of surface compressive stress relaxation is again noted. The surface compressive stress continues to decrease but at a much slower rate as further penetration is made into the glass. Some compressive stress is found to remain at a depth of 250 microns. The interior of the glass, that portion at least 300 microns from either surface, is in tension. The maximum tensile stress developed in the interior being approximately 3,000 pounds per square inch.

EXAMPLE IV

Samples of glass ½ inch by 1 inch by 1/10 of an inch thick of Composition A and of Composition B indicated below were prepared using conventional melting and forming techniques.

Composition B

| Component: | Percent by weight |
|---|---|
| $SiO_2$ | 56.38 |
| $Al_2O_3$ | 19.61 |
| $Li_2O$ | 5.04 |
| $Na_2O$ | 7.00 |
| $P_2O_5$ | 2.96 |
| ZnO | 2.00 |
| $B_2O_5$ | 5.00 |
| $ZrO_2$ | 2.00 |

The strain point of Composition B is approximately 919° F.

Table III presents data describing the types of compressive surface layers developed for several single specie alkali metal ion exchange treatments on glass Compositions A and B.

TABLE III

| Glass Composition | Ion Exchange Treating Bath | Temperature of Exchange, ° F. | Time of Exchange | Depth of Compressive Layer Developed | Surface Compressive Stress Developed |
|---|---|---|---|---|---|
| A | NaNO₃ | 850 | 90 minutes | 300 microns | 55,000 |
| A | KNO₃ | 850 | do | 30 microns | 112,000 |
| B | NaNO₃ | 800 | do | 150 microns | 65,000 |
| B | KNO₃ | 800 | do | 8 microns | 114,000 |

Figure 4:
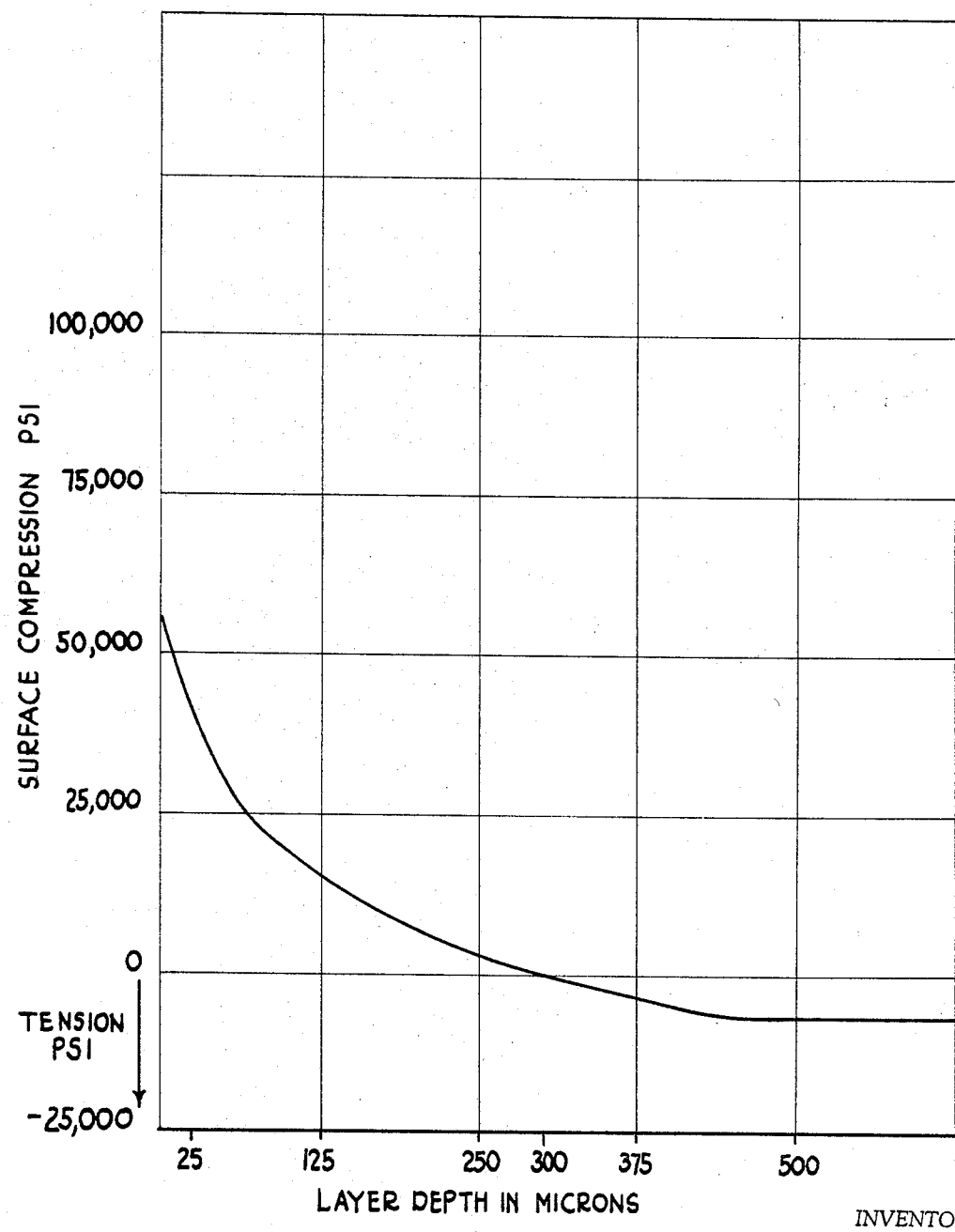
FIGURE 4 is a stress profile determined for a glass article ion exchanged in a 100 percent sodium nitrate molten salt bath.

FIGURE 4 shows the stress profile determined for the ½ inch by 1 inch by 1/10 of an inch sample of glass composition A treated in a 100 percent sodium nitrate molten salt bath at 850° F. for 90 minutes.

Figure 5:
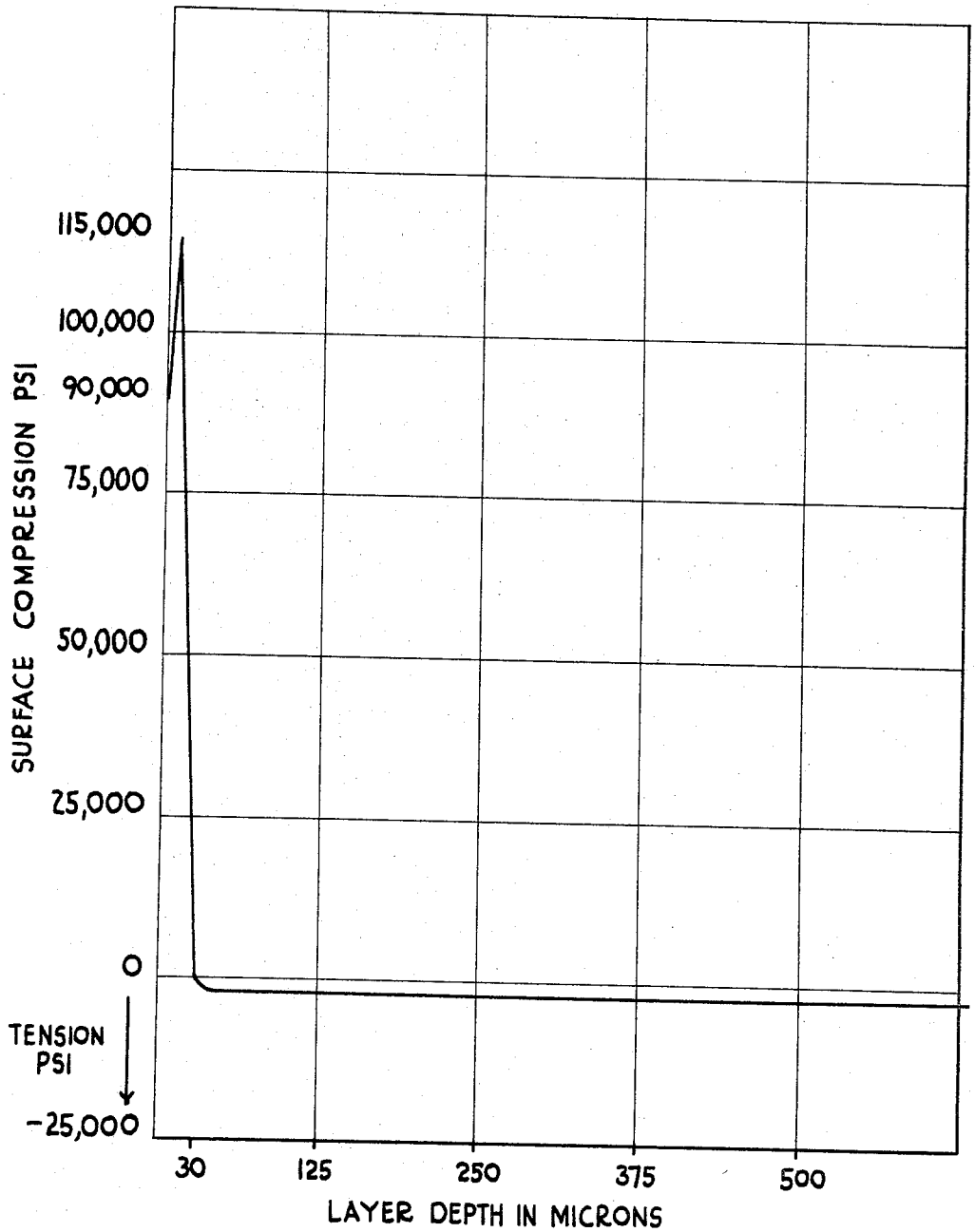
FIGURE 5 is a stress profile determined for a glass article ion exchanged in a 100 percent potassium nitrate molten salt bath and FIGURE 6 is a stress profile determined for a glass article that has first been ion exchanged in a 100 percent sodium nitrate molten salt bath and thereafter ion exchanged in a 100 percent potassium nitrate molten salt bath.

FIGURE 5 shows the stress profile determined for the ½ inch by 1 inch by 1/10 of an inch sample of glass Composition A treated in a 100 percent potassium nitrate molten salt bath at 850° F. for 90 minutes.

Table IV presents data describing the types of compressive surface layers developed for several mixed alkali metal ion exchange treatments on glass Compositions A and B. The column entitled "Ion Exchange Treating Bath" lists the mole ratio of potassium nitrate to sodium nitrate in the treating bath.

TABLE IV

| Glass Composition | KNO₃ to NaNO₃ Ratio in Ion Exchange Treating Bath | Temperature of Exchange, ° F. | Time of Exchange | Depth of Compressive Layer Developed (microns) | Surface Compressive Stress Developed (p.s.i.) |
|---|---|---|---|---|---|
| A | 4:1 | 875 | 60 | 280 | 77,000 |
| A | 8:1 | 875 | 60 | 260 | 96,000 |
| A | 20:1 | 875 | 60 | 250 | 96,000 |
| B | 8:1 | 925 | 30 | 175 | 90,000 |

EXAMPLE V

Figure 6:
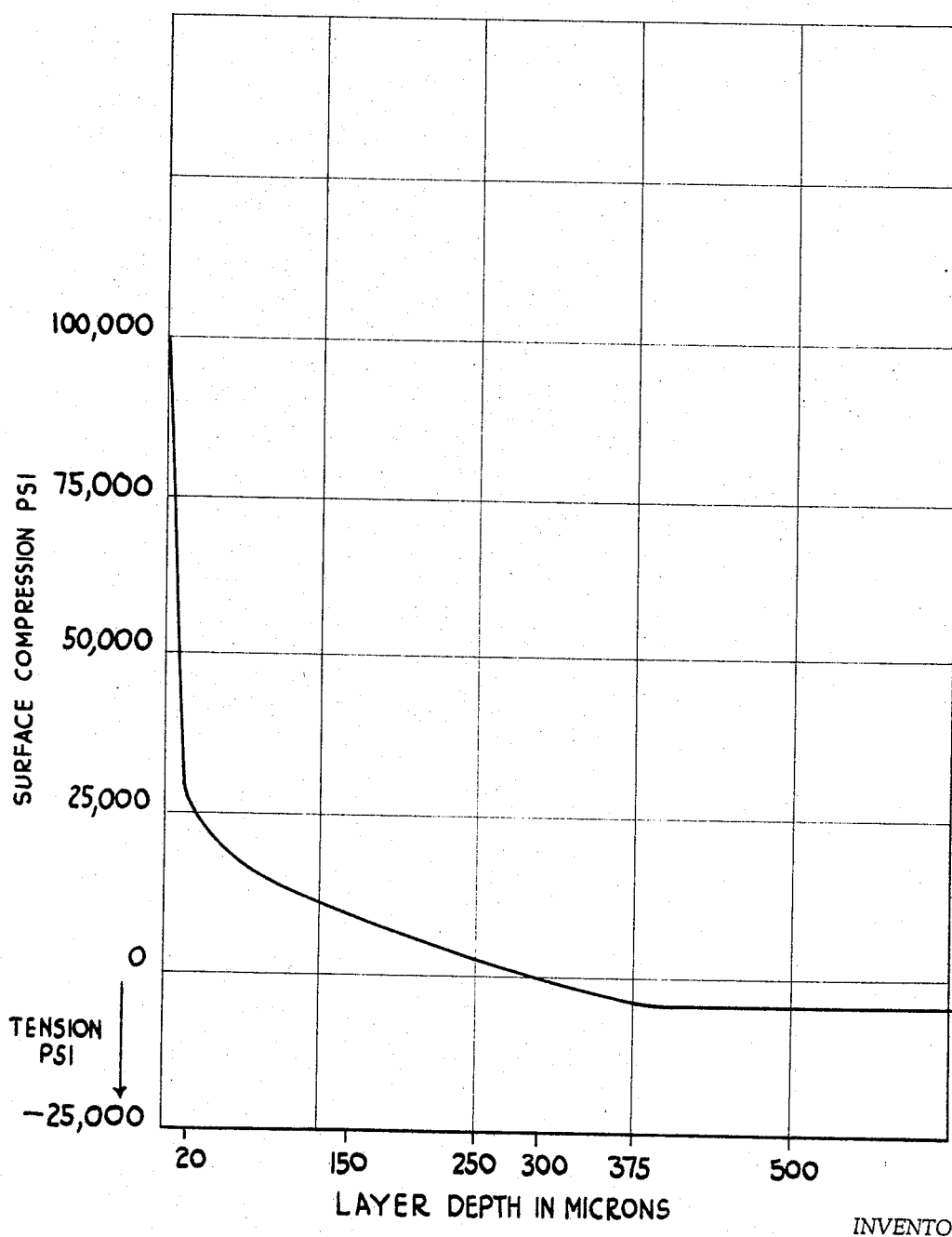

A glass sample ½ inch by 1 inch by 1/10 of an inch thick of Composition A was prepared using conventional melting and forming techniques. This sample was subjected to a stacked ion exchange treatment. The glass sample was first ion exchanged in a 100 percent sodium nitrate molten salt bath at 850° F. for 90 minutes. This sample was thereafter ion exchanged in a 100 percent potassium nitrate molten salt bath at 875° F. for 30 minutes. FIGURE 6 shows the stress profile determined for Composition A subjected to the stacked technique just described.

A comparison of FIGURE 6 with FIGURES 1 and 2 points out that the techniques of the present invention permit the production of a strengthened glass article in a single ion exchange treatment which previously required at least two separate ion exchange treatments.

EXAMPLE VI

To demonstrate the advantages of the present invention several samples of Composition A, 4 inches by 4 inches by 1/10 of an inch were ion exchanged in various single and mixed ion exchange treating baths. The abraded and unabraded modulus of rupture strengths were then determined for the samples to compare the several treatments. For each ion exchange treatment investigated, two samples were prepared. One sample was then abraded. The unabraded sample and the abraded sample were then tested to determine their modulus of rupture strengths in pounds per square inch.

The abrading apparatus consisted of a circular sample support, a tubular shield to confine the abrasion to a circular area about ¾ of an inch in diameter in the center of the sample, a tube within the shield to conduct the abrading particles onto the unprotected portion of the glass sample and a funnel atop the conducting tube through which the abrasive particles were introduced. The abrasion was accomplished by introducing a jet of compressed air into the conducting tube and adding the abrasive particles to the funnel. The air accelerates the abrasive and drives it onto the surface of the glass sample. The abrasive used was ¼ cubic centimeter of 100 B-Alumdum having a particle size of approximately 250 microns. The grit was driven onto the glass surface of the glass sample by a jet of air at 10 pounds pressure per square inch. The grit was poured into the funnel by hand and took only a second or two to be driven through the conducting tube onto the glass sample. The abrasive removed approximately .001 of an inch of glass. The abraded area appeared frosted due to light scattering from the roughened surface.

The unabraded and the abraded samples were then tested to determine their modulus of rupture strengths using a concentric ring load testing apparatus. Each sample was placed on a 3-inch-diameter support ring and a 1½-inch diameter-ring placed on top. The upper ring was positioned in the approximate center of each sample, which in the case of the abraded samples was also the approximate center of the abraded area. The load was applied to each sample by raising the bottom support ring at a constant rate of speed against the fixed upper ring. The load was applied at a rate to develop a stress in the sample of approximately 10,000 pounds per square inch per minute. The modulus of rupture strength in pounds per square inch was then calculated from the load at failure using the following formula:

$$S = .463 W/T^2$$

where S equals the modulus of rupture in pounds per square inch, W equals the failure load and T equals the thickness of the sample in inches.

The results of Example VI are presented in Table V below:

TABLE V

| Sample No. | KNO₃ to NaNO₃ Ratio in Ion Exchange Treating Bath | Temperature of Exchange, ° F. | Time of Exchange | Modulus of Rupture 1,000 (p.s.i.) |
|---|---|---|---|---|
| 1 | KNO₃ only | 880 | 60 minutes | 85 unabraded. |
| 2 | do | 880 | do | 13 abraded. |
| 3 | NaNO₃ only | 850 | do | 72 unabraded. |
| 4 | do | 850 | do | 47 abraded. |
| 5 | 4:1 | 880 | do | 87 unabraded. |
| 6 | 4:1 | 880 | do | 28 abraded. |
| 7 | 8:1 | 880 | do | 93 unabraded. |
| 8 | 8:1 | 880 | do | 23 abraded. |
| 9 | 20:1 | 880 | do | 93 unabraded. |
| 10 | 20:1 | 880 | do | 23 abraded. |

As can be seen in Table V above the 100 percent potassium nitrate ion exchange treatment developed a very high unabraded modulus of rupture strength. The abraded strength, however, was extremely low (13,000 pounds per square inch) due to the relatively thin surface compressive layer developed. The 100 percent sodium nitrate ion exchange treatment developed a lower unabraded modulus of rupture strength than the 100 percent potassium nitrate treatment, but retained a higher strength when abraded. The higher abraded strength for the 100 percent sodium nitrate ion exchange is due to the thicker compressive layer developed.

The glass samples exchanged in the mixed ion exchange baths are seen to exhibit abraded strengths approximately double that of the 100 percent potassium nitrate ion exchanged abraded strengths and higher unabraded strengths than the 100 percent potassium nitrate ion exchange strengths.

Although the technique of the present invention has been described using various mixtures of sodium nitrate and potassium nitrate, the invention is not so restricted. Other salts such as the chlorides and sulfates may also be used.

The present invention is also not limited to the alkali metals of potassium and sodium. Other alkali metals such as rubidium and cesium may be combined with potassium or sodium or with mixtures of potassium and sodium to produce unique glass articles. For example, a mixture of rubidium, potassium and sodium salts can be used to produce a glass article having two knees in its stress profile.

A glass article ion exchanged in such a three alkali ion salt bath would possess three distinct compressive stress zones. The three compressive zones would be first: a very high surface compressive stress zone, a second intermediate zone of high compressive stress and a third zone of moderately high compressive stress. These three compressive stress zones would also differ in thickness. The very high surface compressive stress zone would be very thin. The second intermeditae compressive stress zone would be somewhat thicker and the moderately high compressive stress zone would be of substantial thickness. The concentrations of the various alkali metals in the three compressive zones would also be different. Rubidium would be in greatest concentration in the outermost surface compressive stress zone. The second intermediate compressive stress zone would contain the highest concentration of potassium and the third compressive stress zone would contain the highest concentration of sodium. The knees in the stress profile would occur at the approximate depths to which potassium ion and rubidium ion were exchanged.

Depending upon the article desired, the ion exchange baths of the present invention may contain all combinations and mixtures of at least two of the following alkali metals: cesium, rubidium, potassium and sodium. The stress profiles which can be developed may contain as many as four separate knees.

It is also possible to ion exchange a glass article in accordance with the teachings of the present invention by contacting the article with a paste mixture containing exchangeable alkali metal ions. The paste would be applied to the glass article and then heated for a sufficient time at an elevated temperature but below the strain point of the glass to cause the desired ion exchange.

The preferred alkali metal salt bath mixtures of the present invention consist of various combinations of potassium nitrate and sodium nitrate. The preferred ratio of potassium nitrate on a molar basis, is between 8:1 and 20:1. This preferred molar ratio range develops the desired combination of high surface compressive stress and depth of the surface compressive layer. The molar ratio of potassium to sodium can vary from 2:1 to 50:1, however, and still result in multiple ion exchange in the glass compositions disclosed in the present invention.

Although the present invention has been described in terms of specific examples, the scope of the invention should only be limited by the language of the appended claims.

We claim:

1. A method of treating a glass article consisting essentially of the following components, in percent by weight, 2 to 15 percent $Li_2O$, 2 to 20 percent of an alkali metal oxide selected from the group consisting of $Na_2O$, $K_2O$ and mixtures of $Na_2O$ and $K_2O$, 1 to 24 percent $P_2O_5$, 10 to 35 percent $Al_2O_3$, 30 to 65 percent $SiO_2$, 0 to 12 percent ZnO, 0 to 8 percent MgO, 0 to 10 percent $B_2O_3$, and 0 to 8 percent $ZrO_2$, which comprises contacting the glass at a temperature below the strain point with a source of at least two exchangeable alkali metal ions of different ionic diameter larger than lithium, the molar ratio of larger alkali metal ions to smaller alkali metal ions in said source being at least 2:1, to exchange simultaneously at least two of the alkali metal ions of the source for alkali metal ions of the glass.

2. A method according to claim 1 in which the source of at least two exchangeable different sized ionic diameter alkali metal ions of larger ionic diameter than lithium is a molten mixture of potassium and sodium salts.

3. A method according to claim 2 in which the mixture is a mixture of potassium nitrate and sodium nitrate.

4. A method according to claim 3 in which the mixture of potassium nitrate and sodium nitrate is a mixture containing at least a 4:1 ratio of potassium nitrate to sodium nitrate on a molar basis.

5. A method of treating a glass article consistent essentially of the following components, in percent by weight, 3 to 6 percent $Li_2O$, 4 to 12 percent of an alkali metal oxide selected from the group consisting of $Na_2O$, $K_2O$ and mixtures of $Na_2O$ and $K_2O$, 2 to 12 percent $P_2O_5$, 15 to 28 percent $Al_2O_3$, 40 to 60 percent $SiO_2$, 0 to 3 percent ZnO, 0 to 4 percent MgO, 0 to 7 percent $B_2O_3$, and 0 to 4 percent $ZrO_2$ which comprises contacting the glass at a temperature below the strain point with a source of at least two exchangeable alkali metal ions of different ionic diameter larger than lithium, the molar ratio of larger alkali metal ions to smaller alkali metal ions in said source being at least 2:1, to exchange simultaneously at least two of the alkali metal ions of the source for alkali metal ions of the glass.

6. A method according to claim 5 in which the source of at least two exchangeable different sized ionic diameter alkali metal ions of larger ionic diameter than lithium ion is a molten mixture of potassium and sodium salts.

7. A method according to claim 6 in which the mixture is a mixture of potassium nitrate and sodium nitrate.

8. A method according to claim 7 in which the mixture of potassium nitrate and sodium nitrate is a mixture containing at least a 4:1 ratio of potassium nitrate to sodium nitrate on a molar basis.

9. A method of treating a glass article consisting essentially of the following components, in percent by weight, 44.38 percent $SiO_2$, 26.61 percent $Al_2O_3$, 5.04 percent $Li_2O$, 11.0 percent $Na_2O$, 9.96 percent $P_2O_5$, and 3.0 percent ZnO which comprises contacting the glass at a temperature below the strain point with a source of at least two exchangeable alkali metal ions of different ionic diameter larger than lithium, the molar ratio of larger alkali metal ions in said source being at least 2:1, to exchange simultaneously at least two of the alkali metal ions of the source for alkali metal ions of the glass.

10. A method of treating a glass article consisting essentially of the following components, in percent by weight, 56.38 percent $SiO_2$, 19.61 percent $Al_2O_3$, 5.04 percent $Li_2O$, 7.00 percent $Na_2O$, 2.96 percent $P_2O_5$, 2.00 percent ZnO, 5.00 percent $B_2O_3$, and 2.00 percent $ZrO_2$ which comprises contacting the glass at a temperature below the strain point with a source of at least two exchangeable alkali metal ions of different ionic diameter larger than lithium, the molar ratio of larger alkali metal ions to smaller alkali metal ions in said source being at least 2:1, to exchange simultaneously at least two of the alkali metal ions of the source for alkali metal ions of the glass.

References Cited
UNITED STATES PATENTS 3,287,200 11/1966 Hess et al. _____ 161—1
3,357,876 12/1967 Rinehart _____ 161—1

DONALL H. SYLVESTER, *Primary Examiner.*

JOHN H. HARMON, *Assistant Examiner.*

U.S. Cl. X.R.

65—60, 111, 114; 117—124; 106—52